(12) United States Patent
Besson

(10) Patent No.: US 6,173,032 B1
(45) Date of Patent: Jan. 9, 2001

(54) METHODS AND APPARATUS FOR IMAGE RECONSTRUCTION

(75) Inventor: Guy M. Besson, Wauwatosa, WI (US)

(73) Assignee: General Electric Company, Milwaukee, WI (US)

(*) Notice: Under 35 U.S.C. 154(b), the term of this patent shall be extended for 0 days.

(21) Appl. No.: 09/162,284

(22) Filed: Sep. 29, 1998

(51) Int. Cl.[7] .................................................. A61B 6/03
(52) U.S. Cl. ............................... 378/19; 378/15; 378/901
(58) Field of Search ............................ 378/4, 15, 19, 378/901

(56) References Cited

U.S. PATENT DOCUMENTS

| | | | |
|---|---|---|---|
| 4,852,132 | 7/1989 | Namikawa | 378/19 |
| 5,828,718 | * 10/1998 | Ruth et al. | 378/19 |
| 5,848,117 | * 12/1998 | Urchuck et al. | 378/19 |
| 5,946,371 | * 8/1999 | Lai | 378/19 |

OTHER PUBLICATIONS

G. Besson, "CT fan-beam parameterizations leading to shift-invariant filtering," Inverse Probl. 12, pp. 815–833, 1996.

Berthold K.P. Horn, "Fan-Beam Reconstruction Methods," Proceedings of the IEEE, vol. 67, No. 12, pp. 1616–1623, Dec. 1979.

Berthold K.P. Horn, "Density Reconstruction Using Arbitrary Ray-Sampling Schemes," Proceedings of the IEEE, vol. 66, No. 5, pp. 551–562, May. 1978.

* cited by examiner

*Primary Examiner*—David V. Bruce
(74) *Attorney, Agent, or Firm*—Armstrong Teasdale; Christian G. Cabou; Phyllis Y. Price

(57) ABSTRACT

The present invention, in one form, is a method for improving image reconstruction in computed tomography systems by using a reconstruction algorithm and a detector cell algorithm. In accordance with one embodiment of the present invention, the reconstruction algorithm generates fan-parallel data directly from projection data which is processed to generate image data. In particular and in one embodiment, after view to view rebinning of the projection data, the data is pre- and post-convolution weighted, filtered and backprojected to generate image data. In another embodiment, the detector cell algorithm is utilized to determine the shape of the detector to include an arc sin dependency to eliminate axial interpolation of the projection data.

23 Claims, 4 Drawing Sheets

METHODS AND APPARATUS FOR IMAGE RECONSTRUCTION

BACKGROUND OF THE INVENTION

This invention relates generally to computed tomography (CT) imaging and more particularly, to reconstructing an image from CT scan data.

In at least one known CT system configuration, an x-ray source projects a fan-shaped beam which is collimated to lie within an X-Y plane of a Cartesian coordinate system and generally referred to as the "imaging plane". The x-ray beam passes through the object being imaged, such as a patient. The beam, after being attenuated by the object, impinges upon an array of radiation detectors. The intensity of the attenuated beam radiation received at the detector array is dependent upon the attenuation of the x-ray beam by the object. Each detector element of the array produces a separate electrical signal that is a measurement of the beam attenuation at the detector location. The attenuation measurements from all the detectors are acquired separately to produce a transmission profile.

In known third generation CT systems, the x-ray source and the detector array are rotated with a gantry within the imaging plane and around the object to be imaged so that the angle at which the x-ray beam intersects the object constantly changes. A group of x-ray attenuation measurements, i.e., projection data, from the detector array at one gantry angle is referred to as a "view". A "scan" of the object comprises a set of views made at different gantry angles during one revolution of the x-ray source and detector. In an axial scan, the projection data is processed to construct an image that corresponds to a two dimensional slice taken through the object.

One method for reconstructing an image from a set of projection data is referred to in the art as the filtered backprojection technique. This process converts the attenuation measurements from a scan into integers called "CT numbers" or "Hounsfield units", which are used to control the brightness of a corresponding pixel on a cathode ray tube display.

To reduce the total scan time required for multiple slices, a "helical" scan may be performed. To perform a "helical" scan, the patient is moved while the data for the prescribed number of slices is acquired. Such a system generates a single helix from a one fan beam helical scan. The helix mapped out by the fan beam yields projection data from which images in each prescribed slice may be reconstructed.

At least one known filtered-backprojection image reconstruction technique comprises the steps of pre-processing, filtering and backprojection. In the fan-beam geometry, the backprojection process includes a computationally expensive pixel dependent weight factor. Accordingly, to obtain reasonable reconstruction times, it is necessary in the fan-beam geometry to design and develop an application specific integrated circuit (ASIC) board to perform the backprojection.

Alternatively, it is possible to rearrange the fan-beam data into parallel data, a process known as rebinning. In the parallel geometry, the pixel-dependent backprojection factor is eliminated. At least some known rebinning procedures include a two step process. In the first step, view data are interpolated view-to-view, azimuthally, to obtain projection data samples, identified as Radon samples, that lie on a radial line, intersecting the origin of Radon space. This geometry is referred to as fan-parallel. The second step in the rebinning procedure comprises a radial interpolation. However, in the reconstruction process, data points are filtered by a high-pass filter in the radial direction. Accordingly, radial interpolation, proceeding from non-evenly spaced, is computationally expensive and may compromise the view high-frequencies.

It would be desirable to provide a reconstruction algorithm that enables image reconstruction directly from fan parallel data. It would also be desirable to provide such a reconstruction algorithm that does not require rebinning of the fan beam data. Further, it would be desirable to provide a detector for direct generation of parallel data.

BRIEF SUMMARY OF THE INVENTION

These and other objects may be attained by a reconstruction algorithm which generates image data directly from projection data without requiring radial interpolation. The reconstruction algorithm defines fan beam parameterization for fan parallel reconstruction without radial interpolation of the projection data. Specifically, the reconstruction algorithm includes applying pre- and post convolution weights and filtering the fan-parallel projection data to generate a reconstructed image of the object.

In addition, a detector having variable length detector cells or variable distance gaps between the detector cells can be utilized to generate parallel data without radial interpolation. Specifically, a detector cell algorithm generates positions for locating the center, or locus, of each detector cell of the detector. In one embodiment, the length of each detector cell is altered so that the detector cells are positioned adjacent to one another. In an alternative embodiment, the gaps, or distances, between fixed length detector cells are altered so that parallel data is generated by the detector. In either of these embodiments, the view-to-view interpolation may be replaced by data acquisition system (DAS) channel dependent delays, thereby allowing direct generation of parallel projection data without rebinning or interpolation.

The above described reconstruction algorithm enables image reconstruction directly from fan parallel data. In addition, the reconstruction algorithm generates an image of the object without requiring interpolation of the fan beam data. Further, the above described detector directly generates parallel data.

DETAILED DESCRIPTION OF THE INVENTION

Figure 1:
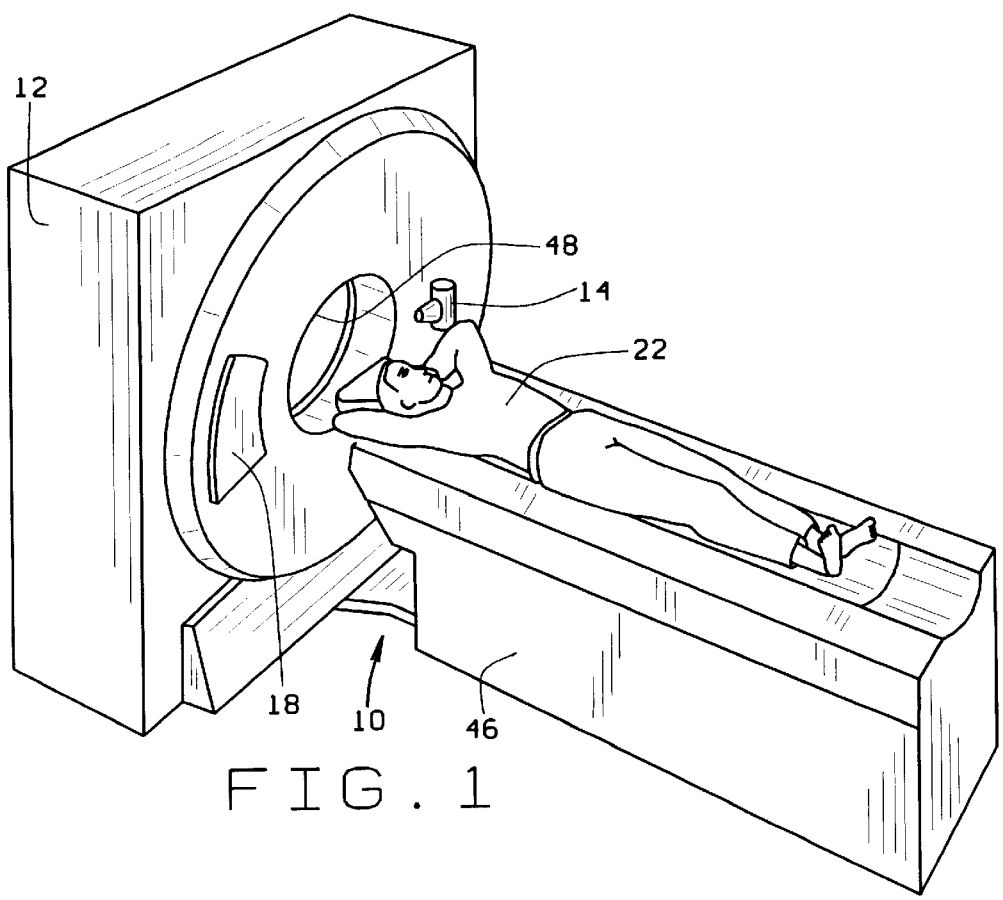
FIG. 1 is a pictorial view of a CT imaging system.
Figure 2:
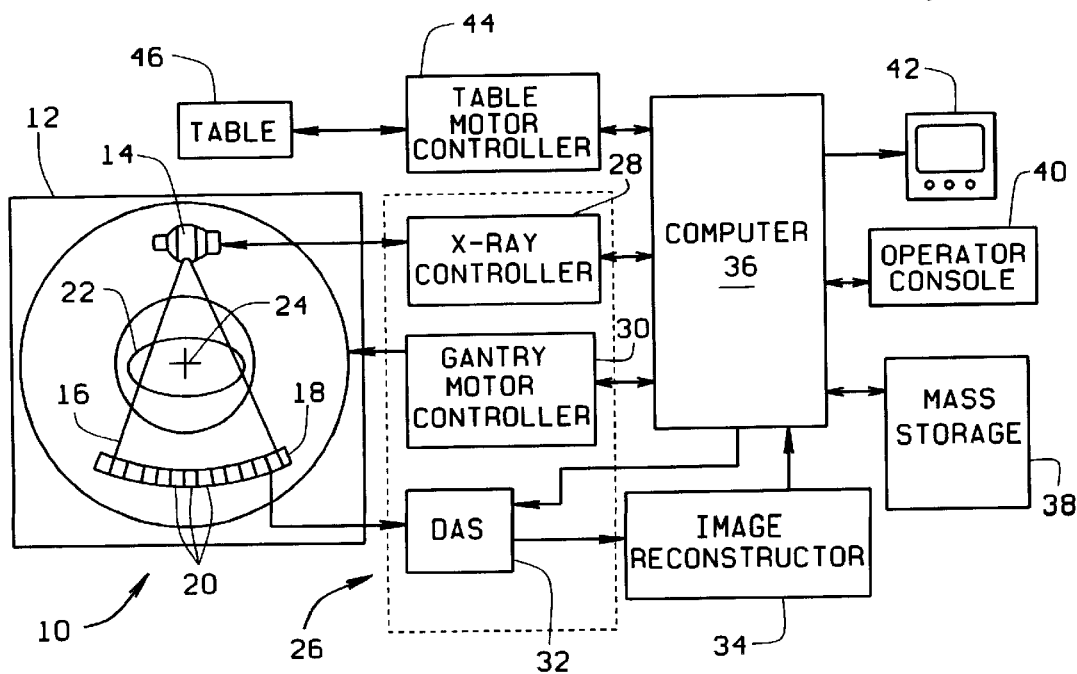
FIG. 2 is a block schematic diagram of the system illustrated in FIG. 1.

Referring to FIGS. 1 and 2, a computed tomograph (CT) imaging system 10 is shown as including a gantry 12 representative of a "third generation" CT scanner. Gantry 12 has an x-ray source 14 that projects a beam of x-rays 16 toward a detector array 18 on the opposite side of gantry 12. X-ray beam is collimated by a collimate (not shown) to lie within in an X-Y plane of a Cartesian coordinate system and generally referred to as an "imaging plane". Detector array 18 is formed by detector elements 20 which together sense the projected x-rays that pass through a medical patient 22. Each detector element 20 produces an electrical signal that represents the intensity of an impinging x-ray beam and hence the attenuation of the beam as it passes through patient 22. During a scan to acquire x-ray projection data, gantry 12 and the components mounted thereon rotate about a center of rotation 24.

Rotation of gantry 12 and the operation of x-ray source 14 are governed by a control mechanism 26 of CT system 10. Control mechanism 26 includes an x-ray controller 28 that provides power and timing signals to x-ray source 14 and a gantry motor controller 30 that controls the rotational speed and position of gantry 12. A data acquisition system (DAS) 32 in control mechanism 26 samples analog data from detector elements 20 and converts the data to digital signals for subsequent processing. In one embodiment, DAS 32 includes a plurality of channels and is referred to as a multiple channel DAS. An image reconstructor 34 receives sampled and digitized x-ray data from DAS 32 and performs high speed image reconstruction. The reconstructed image is applied as an input to a computer 36 which stores the image in a mass storage device 38.

Computer 36 also receives commands and scanning parameters from an operator via console 40 that has a keyboard. An associated cathode ray tube display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 in gantry 12. Particularly, table 46 moves portions of patient 22 through gantry opening 48.

The following discussion which describes a reconstruction algorithm which enables image reconstruction directly from fan parallel data sometimes refers specifically to an axial scan. The reconstruction algorithm, however, is not limited to practice in connection with only axial scans, and may be used with other scans, such as helical scans. It should be further understood that the algorithm described below may be implemented in computer 36 and would process, for example, reconstructed image data. Alternatively, the algorithm could be implemented in image reconstructor 34 and supply image data to computer 36. Other alternative implementations are, of course, possible.

In accordance with one embodiment of the present invention, image reconstruction is completed directly from fan parallel data without radial rebinning of the data. More particularly, the reconstruction algorithm describes fan-parallel weighted-convolution reconstruction kernel decomposition. Specifically and referring to FIG. 3, the polar representation of the Radon transform of $f$ is:

$$p(s, \theta) = \int_{-\infty}^{\infty}\int_{-\infty}^{\infty} f(x, y)\delta(x\cos\theta + y\sin\theta - s)dxdy$$

where: $f(r, \phi)$ is a polar representation of the x-ray attenuation coefficient distribution to be reconstructed and $f(x,y)$ is a Cartesian representation of the x-ray attenuation coefficient distribution to be reconstructed. The reconstruction function is:

$$f(r, \phi) = \frac{1}{4\pi^2}\int_0^{2\pi}\int_{-\infty}^{\infty}\left(\frac{-1}{t}\right)\frac{\partial}{\partial s}p(s, \theta)dsd\theta$$

with $t=s-r\cos(\theta-\phi)$. Interpreting the singular integral in its Cauchy principal value sense leads to:

$$f(r, \phi) = \frac{1}{4\pi^2}\int_0^{2\pi}\lim_{\epsilon \to 0}\int_{-\infty}^{\infty} F_\epsilon(t)p(s, \theta)dsd\theta \quad (1)$$

with:

$$F_\epsilon(t) = \begin{bmatrix} \frac{1}{\epsilon^2}|t| \leq \epsilon \\ \frac{-1}{t^2}|t| \geq \epsilon \end{bmatrix} \quad (2)$$

Figure 3:
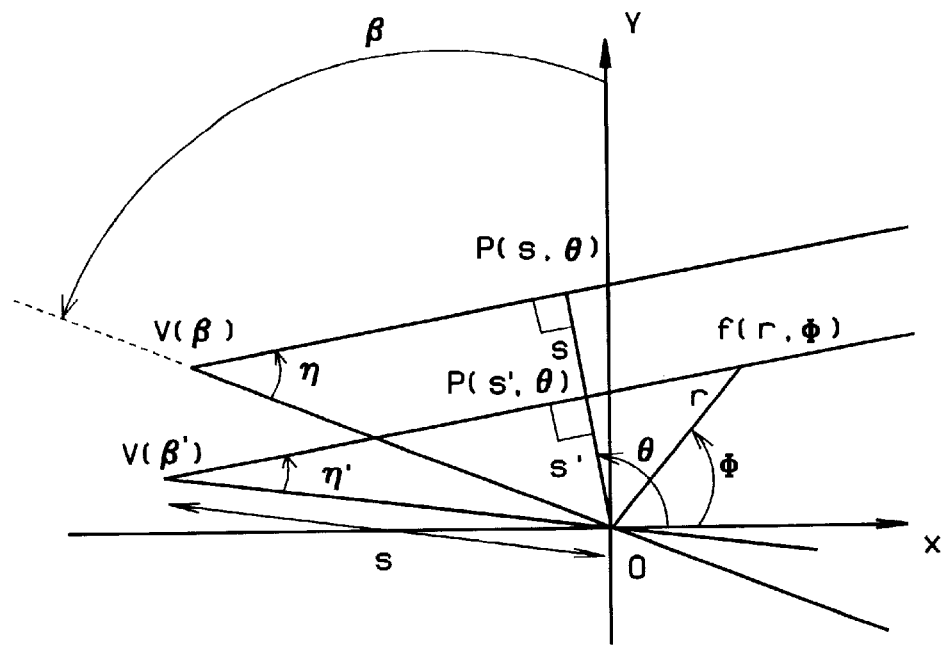
FIG. 3 is illustrates a fan-parallel geometry image in accordance with one embodiment of the present invention.

The Radon space parameterization (s, θ) is then changed into a fan-beam parameterization (a(u), η(v)) to express the integral as a weighted convolution. Referring specifically to FIG. 3, projection data p(s, θ) is parameterized using the angle η from VO to VP where β is the angle from the y axis to the fan vertex V, S the distance from the vertex V to the origin O, and P the point sampled in Radon space by a single fan ray. The origin of the parameterization η is chosen to coincide with the line VO: η(0)=0. As the object to be reconstructed is assumed bounded, the angle η will be limited to [$\eta_{min}$, $\eta_{max}$] so that the entire object cross-section is covered.

The parameters (u, v) are the independent variables describing the system where, for example, u is a scan time and v is a detector cell coordinate on the detector curve. Changing the variables (s, θ) to (u, v) utilizing the parameterizations β(u), η(v), and S(β) leads to:

$$\begin{bmatrix} \theta \\ s \end{bmatrix} = \begin{bmatrix} \beta(u) + \eta(v) \\ S[\beta(u)]\sin[\eta(v)] \end{bmatrix}$$

The parameter limits are defined by $u_{min}$, $u_{max}$, $v_{min}$, and $v_{max}$ so that:

$$\beta(u_{max})-\beta(u_{min})=2\pi, \eta(v_{min})=\eta_{min}, \eta(v_{max})=\eta_{max} \quad (3)$$

The Jacobian of the transformation with S(β)=S constant is:

$$J=\beta'(u)\times\eta'(v)\times S\times\cos[\eta(v)] \quad (4)$$

The transformation of t with the argument of $F_\epsilon$ is:

$$t=s-r\cos(\theta-\phi)$$

so:

$$t=S\times\sin[\eta(v)]-r\cos(\theta-\phi) \quad (5)$$

In fan-parallel reconstruction as in parallel reconstruction, the angle θ is constant for one fan-parallel view. As a result, the fan angle for the ray passing through the point $f(r, \phi)$ to be reconstructed where $\overline{\eta}=\eta(\overline{v})$, is:

$$S\times\sin(\overline{\eta})=r\cos(\theta-\phi)$$

As a result, the argument t is:

$$t = S \times \{\sin[\eta(v)] - \sin[\eta(\overline{v})]\} \quad (6)$$

$$= \left\{\frac{\sin[\eta(v)] - \sin[\eta(\overline{v})]}{v - \overline{v}}\right\} \times S \times (v - \overline{v})$$

where:

$$\lim \varepsilon \to 0 \int_{-\infty}^{\infty} F\varepsilon(\lambda b(\lambda))a(\lambda)d\lambda = \lim \varepsilon \to 0 \int_{-\infty}^{\infty} F\varepsilon(\lambda)\frac{a(\lambda)}{b^2(\lambda)}d\lambda.$$

Using the expression for t from above, the under the summation sign is:

$$F\varepsilon(t) = F\varepsilon(v - \overline{v}) \times \frac{1}{S^2}\left\{\frac{v - \overline{v}}{\sin[\eta(v)] - \sin[\eta(\overline{v})]}\right\}^2.$$

Let K be defined as:

$$K(v, \overline{v}) = \frac{\sin[\eta(v)] - \sin[\eta(\overline{v})]}{v - \overline{v}} \quad (7)$$

Writing $K(\eta,\overline{\eta})$ as a weighted convolution kernel:

$$K(v, \overline{v}) = E(v)H(v-\overline{v})G(v)$$

where H is a convolution kernel, and E and G are pre- and post-convolution weights, then:

$$F\epsilon(t) = \frac{F\epsilon(v - \overline{v})}{S^2[E(v)H(v - \overline{v})G(\overline{v})]^2} \quad (8)$$

As a result of equation 4 being a function of $\eta$, the reconstruction equation is written in the form of a weighted convolution-backprojection as:

$$f(r, \phi) = \quad 9$$

$$\frac{1}{4\pi^2 S^2}\int_{u_{inf}}^{u_{sup}} \lim\epsilon \to o \int_{v_{inf}}^{v_{sup}} \frac{F\epsilon(v - \overline{v})|J(u,v)|dudv}{[E(v)H(v-\overline{v})G(\overline{v})]^2} Xp[\beta(u), \eta(v)]$$

For a given projection, a pre-convolution weighting is applied to the projection data utilizing the E and Jacobian functions. The pre-convolution weights are independent of the image point described by $(r, \theta)$. Convolution kernels F and H are then performed. Prior to backprojecting, a post-convolution weighting G, independent of the image point, is applied.

By following the method described below for the fan-beam reconstruction kernel, a necessary condition for the fan-parallel kernel K to be decomposed is:

$$K(v, \overline{v}) = \frac{\sin[\eta(v)] - \sin[\eta(\overline{v})]}{v - \overline{v}} = E(v)H(v - \overline{v})G(v) \quad (10)$$

The necessary condition can be expressed in term of the fan-beam parameterization $\eta$ as:

$$K(v, \overline{v}) = \frac{\sin[\eta(v)] - \sin[\eta(\overline{v})]}{v - \overline{v}} \quad (11)$$

$$= \left\{\frac{\eta'(v)\cos[\eta(v)]\eta'(\overline{v})\cos[\eta(\overline{v})]}{\eta'(0)\eta'(v-\overline{v})\cos[\eta(v-\overline{v})]}\right\}^{1/2} \frac{\sin[\eta(v-\overline{v})]}{v-\overline{v}}.$$

The necessary condition for $\eta$ is:

$$\sin[\eta(v)] - \sin[\eta(\overline{v})] = \left\{\frac{\eta'(v)\cos[\eta(v)]\eta'(\overline{v})\cos[\eta(\overline{v})]}{\eta'(0)\eta'(v-\overline{v})\cos[\eta(v-\overline{v})]}\right\}^{1/2} \sin[\eta(v-\overline{v})]. \quad (12)$$

Utilizing equation 7 it is clear that $\eta(v)=\text{Arc sin}(a \times v)$ is solution.

To avoid interpolation, the solution $\eta(v)=\text{Arc sin}(a \times v)$ requires either a specific "Arc sin" detector as described below or detector cells having centers distributed along the arc of a circle centered on fan-vertex according to the Arc sin parameterization. Utilizing either of these detector geometries, the reconstruction algorithm reduces to a parallel reconstruction:

$$K(v, \overline{v}) = a,$$

with the Jacobian given by:

$$J = \beta'(u) \times \eta'(v) \times S \times \cos[\eta(v)] = \beta'(u) \times a \times S$$

As a result, the reconstruction equation is:

$$f(r, \phi) = \frac{1}{4aS\pi^2}\int_{u_{inf}}^{u_{sup}} \lim\epsilon \to 0 \int_{v_{inf}}^{v_{sup}} F\varepsilon(v - \overline{v})\beta'(u) \times \quad (13)$$

$$p[\beta(u), \arcsin(v)]dudv$$

so that the Radon samples lie equidistant on radial lines through the origin of Radon space. Using known methods of image reconstruction following either known view-to-view data interpolation, or direct fan-parallel data acquisition via DAS delays, the image is reconstructed.

On a typical third generation CT scanner, $\eta(v)=a \times v$. Substituting into the necessary condition described in equation 11 above, provides:

$$K(v, \overline{v}) = \frac{\sin(a \times v) - \sin(a \times \overline{v})}{v - \overline{v}} \quad (14)$$

$$\approx \left\{\frac{\cos(a \times v)\cos(a \times \overline{v})}{\cos[a \times (v - \overline{v})]}\right\}^{1/2} \frac{\sin[a \times (v - \overline{v})]}{v - \overline{v}}$$

and accordingly to the following image reconstruction algorithm:

$$4S^2\pi^2 \times f(r,\phi) = \int_{u_{inf}}^{u_{sup}} \lim \varepsilon \to \quad (15)$$

$$0 \int_{v_{inf}}^{v_{sup}} \frac{F\varepsilon(v-\bar{v})\cos[a\times(v-\bar{v})]\left\{\frac{v-\bar{v}}{\sin[a\times(v-\bar{v})]}\right\}^2 |J(u,v)| du dv}{\cos(a\times v)\cos(a\times \bar{v})} \times p[\beta(u),\eta(v)].$$

Utilizing equation 4 for the Jacobian, the expression for the pre-convolution weights is equal to 1.0, and the filter expression is:

$$F\varepsilon(v-\bar{v})\cos[a\times(v-\bar{v})]\left\{\frac{v-\bar{v}}{\sin[a\times(v-\bar{v})]}\right\}^2 =$$

$$F\varepsilon(v-\bar{v})\times\left\{\frac{\frac{v-\bar{v}}{2}}{\sin\left[\frac{a\times(v-\bar{v})}{2}\right]}\right\}^2 \times \left\{1-\tan^2\left[a\times\left(\frac{v-\bar{v}}{2}\right)\right]\right\}.$$

The post-convolution weights are:

$$\frac{1}{\cos(a\times\bar{v})}.$$

Equation 14 is exact for any v when $\bar{v}=0$ and the reconstruction equation 15 is exact at the isocenter. Image reconstruction proceeds according to known fan beam geometry reconstruction algorithms except the pre-filtering weights are 1.0, the filtering kernel does not include multiplying by a cosine factor and the post-convolution weights are 1/cos (fan-angle). Additionally, in the backprojection, the inverse square distance from the fan-vertex to the pixel factor is eliminated, and the arctangent function is replaced by an arcsine function.

Alternatively to this "Arc sin" algorithm for direct reconstruction of fan-parallel data, the Arc sin parameterization described above may be used to generate detector cell position information. These new detector geometries, when combined with DAS-dependent channel delays, allow direct parallel reconstruction on a third generation CT scanner. Specifically, position of detector cells along a detector curve can be determined wherein the loci of the detector cells are found for the Arc sin parameterizations utilizing the assumption that the detector cells are equidistant on the detector curve. Alternatively, utilizing the parameterization the detector cell locations can be mapped onto a third-generation detector having an arc of a circle centered on the fan-vertex. Fixed length detector cells are positioned on the arc with the gap, or distance between the detector cells being altered so that the detector generates equispaced parallel data after either view-to-view rebinning or direct DAS delays. The equispaced parallel data is generated from the parallel projection rays which result from the location of the detector cells.

Figure 4:
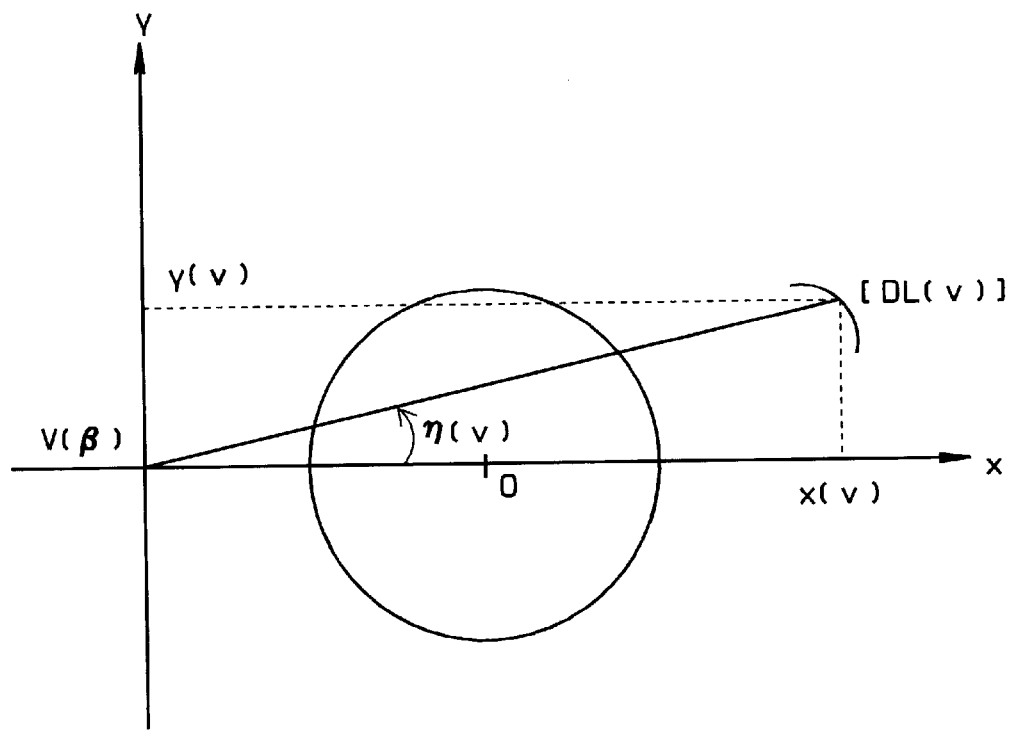
FIG. 4 illustrates a Cartesian coordinate system for a given fan vertex and a detector curve in accordance with one embodiment of the present invention.

More particularly and with respect to FIG. 4, a detector cell D is positioned at a Cartesian coordinate (x,y) where the Cartesian coordinate system is centered on the fan vertex V and the x axis passes through the scanner isocenter O. A DL curve describing the locus of points D(x,y) is parameterized by v: (x,y)=(x(v),y(v)), so that:

$$\frac{y(v)}{x(v)} = \tan[\eta(v)]; \eta(v) = a\tan\left[\frac{y(v)}{x(v)}\right].$$

The condition of cell equidistance translates as:

$$\left[\frac{dx(v)}{dv}\right]^2 + \left[\frac{dy(v)}{dv}\right]^2 = 1.$$

Substituting, and with $\eta(v)$=Arc sin ($a\times v$):

$$y(v) = x(v) \times \tan[\eta(v)] = \frac{x(v) \times a \times v}{\sqrt{1-(a\times v)^2}}$$

the differential equation is:

$$\frac{dx(v)}{dv} = M(x,v).$$

The second degree equation relating x'(v) to x(v) and v is:

$$A(v)x'^2(v)+B(v,x)x'(v)+C(v,x)=0$$

with:

$$A(v) = \frac{1}{1-a^2\times v^2}, B(v,x) = \frac{2a^2vx(v)(1+a^2v^2)}{[1-a^2\times v^2]^2}, \text{ and}$$

$$C(v,x) = \frac{a^2x^2(v)(1+a^2v^2)}{[1-a^2\times v^2]^3} - 1.$$

The function M relating x' to x and v is therefore the algebraic expression for the roots of a second degree polynomial. Using the Runge-Kutta method, a numerical solution is calculated so that as x'(v) is given by the expression for the roots of a second degree equation, there exists two detector geometry classes. Each geometry class represents a root. To obtain a curve that is symmetric with respect to the x axis, the condition x'(-v)=-x'(v) is imposed by switching roots at v=0. Further, $x(0)=x_0$ is fixed to 1.0, and the solutions are calculated starting from v=0 to $v=v_{min}$ and then starting again from v=0 to $v=v_{max}$.

Figure 5A:
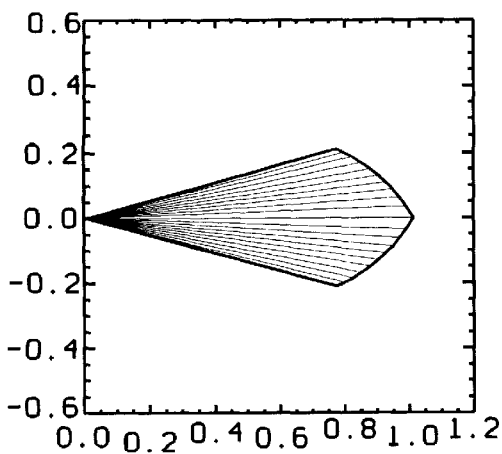
FIGS. 5a–5f illustrate various detector geometries for direct parallel data generation.
Figure 5B:
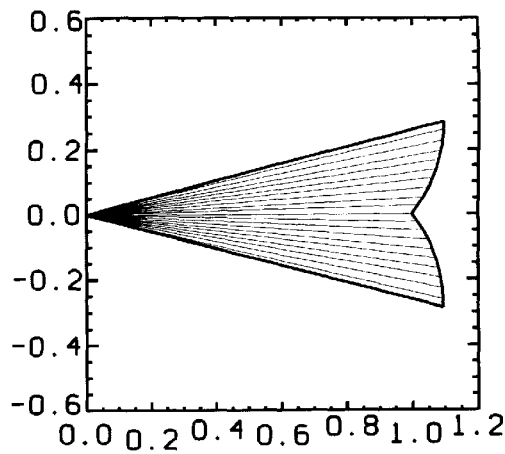
Figure 5C:
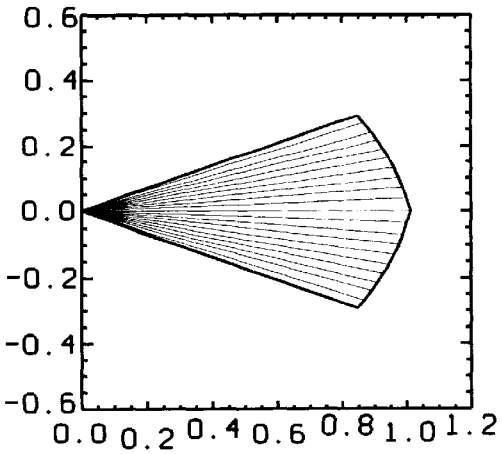
Figure 5D:
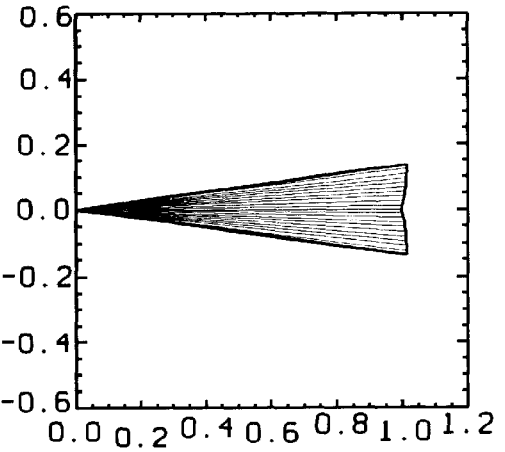
Figure 5E:
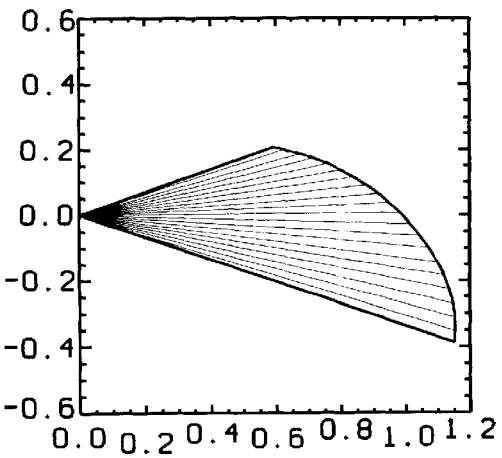
Figure 5F:
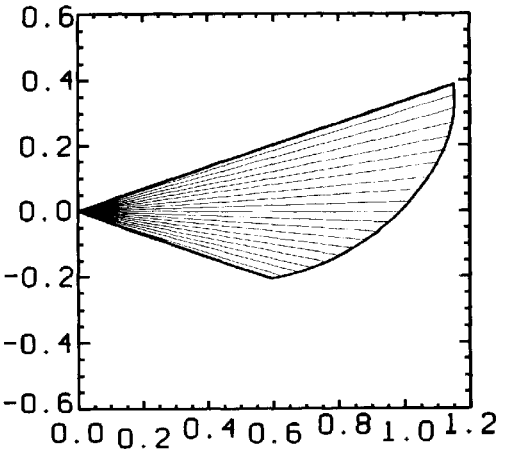

To obtain a detector curve with a continuous derivative on the x axis for v=0, it is necessary that x'(0)=0. This requires x(0)×a=1.0, and it can be shown that under that condition the discriminant becomes negative in the neighborhood of v=0. Accordingly, the x-axis symmetric solutions all have an inflexion point at the origin. Six solutions corresponding to the values of three different parameters and their associated two detector geometries are given in FIG. 5a through 5f. In FIGS. 5a and 5b, a=0.8, starting with first and second solutions respectively and switching roots at 0, $v_{max}$=0.32. In FIGS. 5c and 5d, a=0.95, $v_{max}$=0.35 (c) and $v_{max}$=0.131 (d). In FIGS. 5e and 5f, a=0.7, $v_{max}$=0.455, first and second solutions shown without switching roots at v=0.

Figure 6:
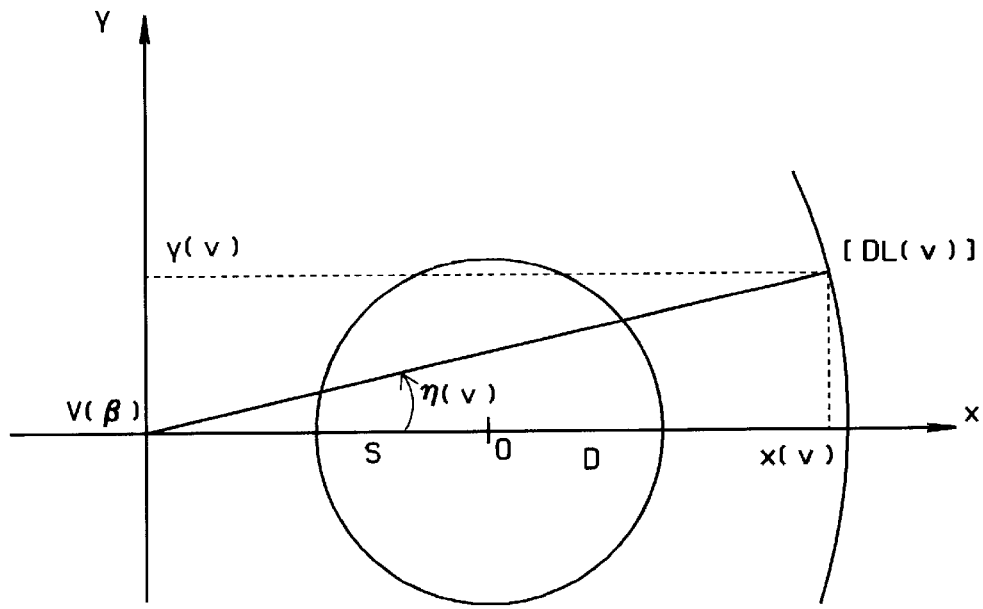
FIG. 6 illustrates a detector curve of an alternative embodiment of the detector shown in FIG. 4.
Figure 7:
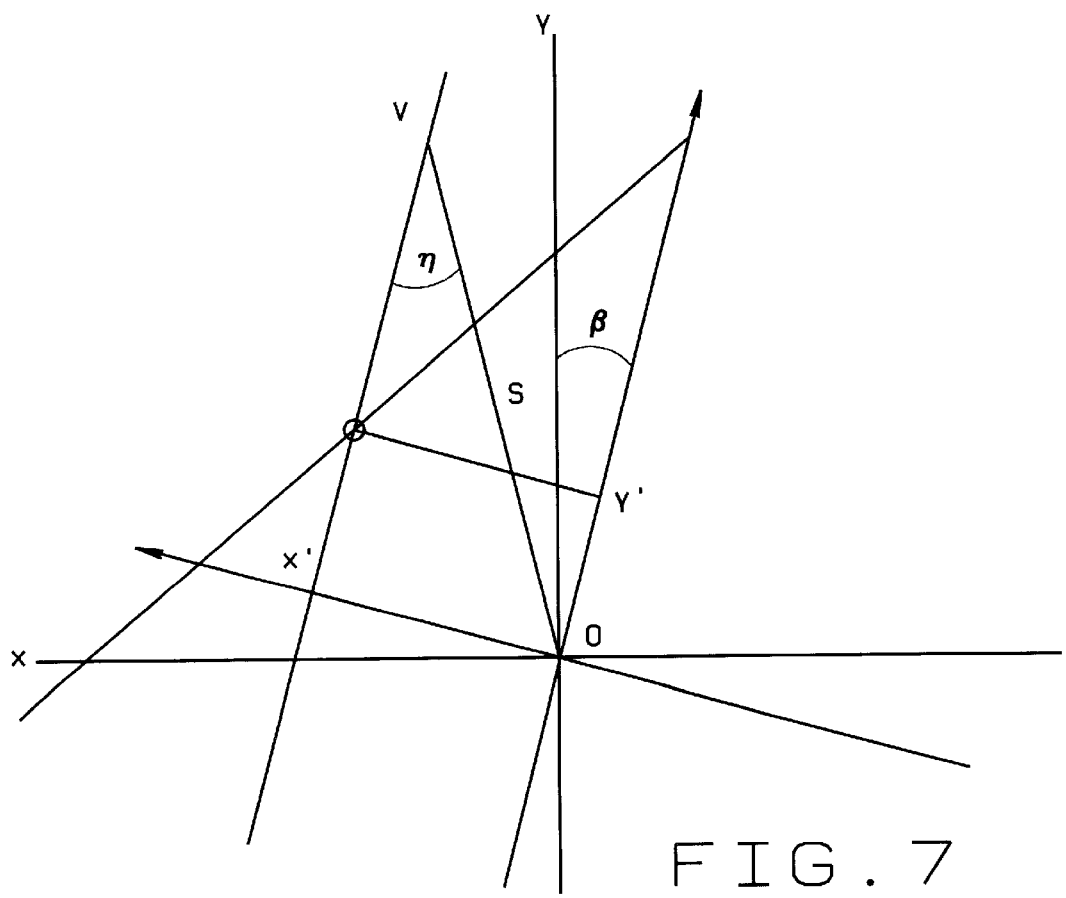
FIG. 7 illustrates backprojection utilizing a reconstruction algorithm in accordance with one embodiment of the present invention.

In an alternative embodiment, the detector cells of a detector are arranged on the traditional third generation detector geometry curve, with variable gaps, or distances between the cells. Specifically and referring to FIG. 6, utilizing a Cartesian coordinate system centered on the fan vertex V and the x-axis passing through the scanner isocenter O, detector cell d is positioned at the Cartesian coordinates of (x, y). S and D are respectively the vertex-to-isocenter and isocenter-to-detector distances. As above, the DL curve describing the locus of points d(x,y) is parameterized by v: (x,y)=(x(v),y(v)), and the geometric constraint is:

$$[x(v)]^2 + [y(v)]^2 = (S + D)^2$$

Substituting, $$\eta(v) = \arcsin(a \times v)$$

the following parameterization is obtained:

$$(x(v), y(v)) = (S+D)([1-a^2 \times v^2]^{1/2}, a \times v).$$

The locations of the detector cell centers are determined by stepping on this parameterized curve at equal increments of the parameter v. In one embodiment, for example, the detector includes detector cells having variable lengths and being coupled to an arc shaped detector housing (not shown). The detector cells are positioned adjacent to one another. In an alternative embodiment, the detector includes detector cells of constant cell length and are coupled to the detector housing with varying distances, or gaps, between the cells.

Utilizing the variable length detector cells or variable gap size detector, as determined by the detector cell algorithm, the detector generates parallel data directly from the projection data with either view-to-view rebinning or DAS delays.

The above described algorithms allow images to be reconstructed directly from fan parallel data. Specifically, utilizing a detector having detector cells located in positions determined by the detector cell algorithm, the reconstruction algorithm allows direct parallel reconstruction of fan-beam data without interpolation. As a result, the computationally intensive step of radial interpolation with its associated resolution degradation can be eliminated. In addition, the reconstruction algorithm eliminates the backprojection pixel-dependent weight. Utilizing the two algorithms provides increased image quality by reducing aliasing and maintaining resolution, while reducing the number of calculations for image reconstruction.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A detector for use in a computed tomography system, said detector comprising a plurality of detector cells and a housing, each of said detector cells comprising a cell length and secured to said housing to form a gap therebetween, said detector configured to be positioned to directly generate fan parallel data.

2. A detector in accordance with claim 1 wherein said each of said detector cells comprise a variable cell length.

3. A detector in accordance with claim 2 wherein said cells are located at locus points x(v), y(v) in accordance with:

$$(x(v), y(v)) = (S+D)([1-a^2 \times v^2]^{1/2}, a \times v),$$

where S=a detector vertex to a detector isocenter distance
D=detector isocenter to a detector cell distance.

4. A detector in accordance with claim 3 wherein said detector cells each comprise a fixed length, and wherein said detector cell gaps are adjusted to position said detector cells at said locus points.

5. A detector in accordance with claim 3 wherein said detector cells each comprise an adjustable length, and wherein detector is configured so that each detector cell is adjacent another detector cell.

6. A method for producing a tomographic image of an object from projection data acquired in a tomographic scan, said method comprising the steps of:
utilizing view-to-view rebinning of the projection data to generate fan parallel data from the projection data; and
generating image data from fan parallel data.

7. A system for producing a tomographic image of an object from projection data acquired in a tomographic scan, said system configured to:
utilize view-to-view rebinning of the projection data to generate fan parallel data from the projection data; and
generate image data from fan parallel data.

8. A method of generating parallel data directly from a detector in a computed tomography system, the detector including a plurality of detector cells and a housing, each of said detector cells including a cell length therebetween, said method comprising the steps of:
determining the position of each detector cell so that fan parallel data is directly generated; and
securing each of the detector cells to the housing at the determined positions.

9. A method in accordance with claim 8 wherein determining the position of each detector cell comprises the step of determining a center point x(v), y(v) of each detector cell in accordance with:

$$(x(v), y(v)) = (S+D)([1-a^2 \times v^2]^{1/2}, a \times v),$$

where S=a detector vertex to a detector isocenter distance
D=detector isocenter to a detector cell distance.

10. A method in accordance with claim 9 wherein each detector cell has a fixed length, and wherein securing each of the detector cells to the housing at the determined positions comprises the step of altering the distance between the detector cells to position the detector cells at the locus points.

11. A method in accordance with claim 9 wherein each detector cell has a variable cell length.

12. A method in accordance with claim 11 wherein securing each of the detector cells to the housing at the determined positions comprises the step of altering the length of each detector cell to position each detector cell adjacent another detector cell.

13. A method in accordance with claim 8 wherein each detector cell includes an output signal and wherein said method further comprises the step of generating parallel projection rays.

14. A method in accordance with claim 8 wherein generating parallel projection rays comprises the step of view-to-view interpolation of the detector output signals.

15. A method in accordance with claim 13 wherein the computed tomography system further includes a multiple channel data acquisition system coupled to the detector and wherein generating parallel rays comprises the step delaying the output signals of each detector cell utilizing a data acquisition system channel dependent delay.

16. A method for producing a tomographic image of an object from projection data acquired in a tomographic scan, said method comprising the steps of:

generating fan parallel data from the projection data;

applying pre-convolution weights to the projection data;

filtering the weighted projection data to generate filtered data;

applying post convolution weights to the filtered data; and backprojecting the weighted filtered data to generate image data.

17. A method in accordance with claim 16 wherein applying the pre-convolution weights comprises the step of multiplying the projection data by one.

18. A system in accordance with claim 16 wherein filtering the weighted projection data comprises the step of applying a filter in accordance with:

$$F\varepsilon(v - \bar{v}) \times \left\{ \frac{\frac{v - \bar{v}}{2}}{\sin\left[\frac{a \times (v - \bar{v})}{2}\right]} \right\}^2 \times \left\{ 1 - \tan^2\left[a \times \left(\frac{v - \bar{v}}{2}\right)\right] \right\}.$$

19. A method in accordance with claim 16 wherein the post convolution weights are in accordance with:

$$\frac{1}{\cos(a \times \bar{v})}.$$

20. A system for producing a tomographic image of an object from projection data acquired in a tomographic scan, said system configured to:

generate fan parallel data from the projection data;

apply pre-convolution weights to the projection data;

filter the weighted projection data to generate filtered data;

apply post convolution weights to the filtered data; and backprojecting the weighted filtered data to generate image data.

21. A system in accordance with claim 20 wherein said reconstructor filter is in accordance with:

$$F\varepsilon(v - \bar{v}) \times \left\{ \frac{\frac{v - \bar{v}}{2}}{\sin\left[\frac{a \times (v - \bar{v})}{2}\right]} \right\}^2 \times \left\{ 1 - \tan^2\left[a \times \left(\frac{v - \bar{v}}{2}\right)\right] \right\}.$$

22. A system in accordance with claim 20 wherein said post convolution weights are in accordance with:

$$\frac{1}{\cos(a \times \bar{v})}.$$

23. A system in accordance with claim 19 wherein said pre-convolution weights equal one.

* * * * *

UNITED STATES PATENT AND TRADEMARK OFFICE
CERTIFICATE OF CORRECTION

PATENT NO. : 6,173,032 B1
DATED : January 9, 2001
INVENTOR(S) : Guy M. Besson

It is certified that error appears in the above-identified patent and that said Letters Patent is hereby corrected as shown below:

<u>Column 11, claim 18,</u>
Line 23, delete "system" and insert therefor -- method --.
In the equation, delete "$F\varepsilon\ (v\text{-}v)x$" and insert therefor -- $F\varepsilon\ (v\text{-}\bar{v})x$ --.

<u>Column 12, claim 23,</u>
Line 31, delete "19" and insert therefor -- 20 --.

Signed and Sealed this

Second Day of April, 2002

*Attest:*

JAMES E. ROGAN
*Attesting Officer*     *Director of the United States Patent and Trademark Office*